(12) United States Patent
Petrenko (10) Patent No.: US 6,693,786 B2
(45) Date of Patent: Feb. 17, 2004

(54) MODIFICATION OF ICE FRICTION IN TRANSPORTATION SYSTEMS

(75) Inventor: Victor F. Petrenko, Lebanon, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 358 days.

(21) Appl. No.: 09/872,295

(22) Filed: Jun. 1, 2001

(65) Prior Publication Data

US 2001/0052731 A1 Dec. 20, 2001

Related U.S. Application Data (60) Continuation-in-part of application No. 09/426,685, filed on Oct. 25, 1999, which is a division of application No. 09/094,779, filed on Jun. 15, 1998, now Pat. No. 6,027,075.
(60) Provisional application No. 60/262,775, filed on Jan. 19, 2001.

(51) Int. Cl.[7] .............................................. H01H 47/00
(52) U.S. Cl. ..................... 361/144; 174/110 R; 280/757
(58) Field of Search ........................ 361/144; 307/10.1; 280/757; 174/110 R; 244/134 R (56) References Cited

U.S. PATENT DOCUMENTS

| | | | | |
|---|---|---|---|---|
| 6,134,096 A | * | 10/2000 | Yamada et al. | ............. 361/234 |
| 6,270,118 B1 | * | 8/2001 | Ichikawa | ..................... 280/757 |
| 6,370,004 B1 | * | 4/2002 | Yamaguchi | ................. 361/234 |
| 6,550,508 B1 | * | 4/2003 | Yamaguchi et al. | ......... 152/167 |

OTHER PUBLICATIONS

Electromechanical Phenomena in Ice; Victor F. Petrenko; Thayer School of Engineering Special Report 96–2; Feb. 1996.
The effect of static electric fields on ice friction; Victor F. Petrenko; J. Appl. Phys. 76 (2), Jul. 15, 1994; 1994 American Institute of Physics.
Generation of electric fields by ice and snow friction; Victor F. Petrenko; J. Appl. Phys. 77 (9), May 1, 1995; 1995 American Institute of Physics.

* cited by examiner

*Primary Examiner*—Brian Sircus
*Assistant Examiner*—James Demakis
(74) *Attorney, Agent, or Firm*—Curtis A. Vock; Lathrop & Gage L.C.

(57) ABSTRACT

A plurality of electrodes in a solid object are located proximate to the contact interface between an ice layer and the surface of the solid object. A power source provides a potential difference across the electrodes to generate an electric field at the contact interface, thereby increasing the friction force between the solid object and the ice. Preferably, the power source is in AC power source. A capacitor in series between the power source and the electrodes creates an additional impedance for limiting the AC current to a level safe for human exposure.

54 Claims, 7 Drawing Sheets

MODIFICATION OF ICE FRICTION IN TRANSPORTATION SYSTEMS

RELATED APPLICATIONS

This application claims the benefit of U.S. provisional application Serial No. 60/262,775, filed Jan. 19, 2001. This application is also a continuation-in-part application of commonly-owned and copending U.S. patent application Ser. No. 09/426,685, filed Oct. 25, 1999, which is a divisional application of U.S. patent application Ser. No. 09/094,779, filed Jun. 15, 1998, issued as U.S. Pat. No. 6,027,075 on Feb. 22, 2000, each of which is hereby incorporated by reference.

GOVERNMENT LICENSE RIGHTS

The U.S. Government has certain rights in this invention as provided for by the terms of Grant #DAAH 04-95-1-0189, awarded by the Army Research Office, and of Grant No. MSS-9302792, awarded by the National Science Foundation.

FIELD OF THE INVENTION

The invention is related to the field of ice adhesion, specifically, to increasing selectively the friction between ice and the surfaces of solid objects, in particular, to surfaces in transportation systems.

BACKGROUND OF THE INVENTION
Statement of the Problem

Skidding, slipping and sliding on ice surfaces cause numerous types of problems. Ice on roads is frequently a cause of automobile accidents resulting in personal injury and death, as well as material damage. Large amounts of material resources, money and man-hours are spent annually to remove ice and snow from roads and other automotive surfaces and to reduce risks of slipping and skidding on iced surfaces. The accidents and time delays associated with icy roads are major causes of inconvenience and personal and economic damage.

Effects of DC electrical fields on friction between ice and a "slider" have been reported in the literature. See, for example, "The effect of static electric field on ice friction", V. Petrenko, *Journal of Applied Physics*, 76 (2), 1994; "Electromechanical Phenomena in Ice", V. Petrenko, Special Report 96-2, US Army Corps of Engineers CRREL, 1996. The experiments reported in these publications were restricted to DC electric fields. Also, these publications did not teach practical uses of electric fields to increase friction between a solid surface and ice.

SUMMARY OF THE INVENTION

The invention helps to solve some of the problems mentioned above by providing systems and methods for modifying the friction force between ice and the surfaces of solids. Systems and methods in accordance with the invention are particularly applicable to problems associated with ice and surfaces in the field of automotive transportation; however, systems and methods in accordance with the invention are generally applicable to reduce problems caused by skidding, slipping and sliding on ice.

In systems and methods in accordance with the invention, friction between a solid object and a layer of ice is increased by generating a strong electric field at the contact interface of the solid and the ice. A strong electric field at the contact interface is generated in a system including: a plurality of electrodes in the solid object, wherein the electrodes are located proximate to the contact interface; and a power source electrically connected to the electrodes, wherein the power source is capable of providing a potential difference across the electrodes to generate an electric field at the contact interface. The electric field strength at the contact interface typically has a value in a range of from 100 V/cm to $10^5$ V/cm. Preferably, an AC power source provides the potential difference to generate an AC electric field at the contact interface. Typically, the AC electric field has a frequency not exceeding 1000 Hz. Preferably, the AC electric field has a frequency not exceeding 200 Hz. More preferably, the AC frequency is in a range of about 5 to 100 Hz. An advantage of a system and a method in accordance with the invention is that relatively low-frequency power may be used to generate an AC electric field at the contact interface. Alternatively, the power source may be a DC power source.

In embodiments in accordance with the invention, the interelectrode spacing separating oppositely polarized electrodes is preferably as small as possible. Generally, the electrodes are separated from each other by an interelectrode spacing not exceeding 10 mm. Preferably, the interelectrode spacing does not exceed 100 micrometers ($\mu$m). The electrodes may be interdigitated. Also, the electrodes should be at or as close as possible to the contact interface of the surfaces of the solid object and the ice. In this specification, the term "proximate to the contact interface" means at the contact interface or within 1 cm of the contact interface. The region between electrodes corresponding to the interelectrode spacing contains electrically insulating material so that the voltage difference across the electrodes generates a strong electric field. Thus, the solid object typically comprises electrical insulation that insulates each of the electrodes. Each electrode preferably possesses an electrical conductivity greater than $10^{-10}$ Siemens/cm ("S/cm"). The solid object may contain dopants to increase electrical conductivity in the electrodes. A common application of the invention is to increase friction between a layer of ice covering a paved surface and a rubber tire of an automobile or airplane. Electrodes in the rubber tire may be fabricated by including dopants in regions of the tire near its cylindrical outer surface to make conductive electrode regions. For example, the rubber tire may contain carbon black to impart or increase electrical conductivity.

Embodiments in accordance with the invention are useful in a wide variety of situations. For example, the solid object may be, among others, a rubber tire, a wheel of a rail vehicle, a track of a tracked vehicle, a shoe sole, or a snow ski. A system in accordance with the invention may comprise a plurality of conductive solid objects, each solid object forming a contact interface with ice, and each solid object including a plurality of electrodes. In such cases, a power source is electrically connected to each of the electrodes. The supplied electrical power provides a potential difference across each pair of adjacent electrodes. The potential difference generates an electric field at the ice-solid contact interfaces. For example, the invention may be utilized in two or more tires of an automobile.

The power source provides a voltage in a range of about 1 to 5000 volts, but more commonly in a range of about 5 to 2000 volts. Preferably, a power source providing a voltage not exceeding 500 volts generates a sufficiently strong electric field at the contact interface to increase friction. Under preferred conditions, when the interelectrode spacing is less than one mm, and the electrodes are located within one mm of the contact interface, a voltage in a range of about 5 to 100 volts is effective.

In preferred embodiments, only a small group of electrode pairs, which are proximate to the ice-solid contact interface, are electrically connected to the power source, while electrodes that are not proximate to the contact interface are not electrically connected to the AC power source. Various types of switching mechanisms are useful for connecting and disconnecting the AC power source to electrodes. In tires, for example, the electrical connection may be achieved with slip rings that are similar to the slip rings used in electromotors. (In electromotors, the slip rings provide connections of the rotor coils that are directly opposed to the static electromagnets.) Another feature in preferred embodiments is an additional impedance between the AC power source and the electrodes to limit AC current at the electrodes. Typically, a capacitor is located in series between the AC power source and the electrodes.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DESCRIPTION OF THE INVENTION

The invention is described herein with reference to FIGS. 1–13. It is understood, however, that the embodiments and examples presented here are not intended to limit the scope of the invention, which is defined in the claims below.

When an electric field exists at the contact interface between an ice surface and the surface of the solid, friction between the ice and the solid surface is increased relative to the friction in the absence of an electric field. This can be largely explained as a result of the well-known physical phenomenon that an electric field attracts a dielectric object. In the absence of an electric field, the region of the contact interface between a solid surface and an ice surface contains many air gaps or voids. Indeed, the area of actual contact between the surface of the solid object and the ice in the absence of an electric field may be less than one percent. Generally, ice has a high relative dielectric constant. Air has a low dielectric constant. A strong electric field in the region of the ice-solid interface attracts high-dielectric ice into the gaps. Thus, the high electric field may be viewed as causing rapid growth of tiny ice bridges connecting the solid surface and the ice. The resulting increased area of actual ice-solid contact causes an increase in friction between the solid and the ice. Actual physical mechanisms known to provide rapid mass transport that fills the air gaps are: water flow in a liquid-like layer on the ice surface; and water vapor diffusion. The electric field may be either a DC electric field or a low-frequency AC field. When the ice is subjected to AC current or to an AC electric field having a frequency not exceeding about 1000 Hz, or 1 kHz, the "relative dielectric constant" ("$\epsilon$" or simply "dielectric constant") is typically about 100 or greater, depending significantly on ice purity and temperature. When the AC frequency exceeds 1000 Hz, however, the dielectric constant decreases significantly. For example, the relative dielectric constant of ice at a frequency of 10 kHz is only about 10 or less, and at 100 kHz, it has a value of about 3. The dielectric constant of ice in a DC field or current is high, as with low-frequency AC. Nevertheless, DC current flowing between electrodes through ice at the contact interface causes electrolysis reactions. Hydrogen and oxygen gas bubbles that form as a result of electrolysis at the contact interface decrease the area of actual ice-solid contact, and thereby decrease friction between the solid and the ice. The formation of gas bubbles by electrolysis also occurs at very low AC frequencies up to about 5–10 Hz. At frequencies in excess of 5–10 Hz, the cycle time of alternating polarities of the electrodes is too short for nucleation of hydrogen and oxygen gas bubbles at each electrode to occur. Thus, an AC electric field having a frequency greater than about 5–10 Hz is preferred over a DC electric field. For these reasons, embodiments in accordance with the invention typically include an AC electric field at the contact interface having a frequency not exceeding 500 Hz, and most preferably in a range of about 5 to 100 Hz.

The term "contact interface" is used herein to denote the region in which the surface of the solid object and the surface of ice are adjacent and contiguous to each other. It is understood that the contact interface typically includes air gaps and voids and perhaps areas occupied by a liquid-like water layer, as well as areas of actual physical contact between the solid and the ice.

It is believed that electrostatic pressure is a second physical phenomenon that contributes to the friction between a solid surface and ice in the presence of an electric field. An electric field, E, at the interface between ice and the surface of a solid object may reach a significant magnitude and provide additional electrostatic pressure, $P_{el}$, normal to the surface of the solid. The additional pressure normal to the solid surface increases friction. The increase in electrostatic pressure between a solid surface and ice produced by an electric field, E, at the solid-ice contact interface is expressed by the following equation:

$$P_{el} = \epsilon_o E^2 = \epsilon_o (V/d)^2 \quad (1)$$

where $\epsilon_o$ is a dielectric constant of free space, V is the potential difference between electrodes proximate to the contact interface, and d is the distance between electrodes. Because the friction force is proportional to the normal force of the electrostatic pressure, $P_{el}$, friction increases with $P_{el}$. Generally, in systems and methods in accordance with the invention, a pair of electrodes is located in the solid object, and the electrodes are separated by a small interelectrode spacing having high resistance. By providing high electrical resistance in the small interelectrode spacing, d', and by maintaining low resistances throughout the remainder of the circuit, the potential difference, V', across the interelectrode spacing, d', between the electrodes is maximized. As a result, the strength of the electric field, V'/d', is maximized for a given applied voltage.

Fundamentally, an electric field is generated at the contact interface by providing a voltage difference between closely spaced electrodes proximate to the contact interface. The relative locations of electrodes having opposite polarities is not important. The important factor is strength of the electric field at the ice-solid interface. For example, it is not important whether two electrodes are located within the solid object at or proximate to the contact interface, or whether one electrode is located in the solid object, and the other electrode is located in an ice layer or beneath an ice layer. The solid object may be any object, for example, tires, tracked vehicle treads, train wheels, the sole of a shoe, parts of sports equipment. If a plurality of electrodes having different polarities is located in the solid object, then the solid object must include electrical insulation between electrodes so that a potential difference exists to generate an electric field.

In a typical embodiment, the electrodes are separated by an interelectrode spacing of the order of 1–10 mm, or even several cm, and a power source provides an AC potential of about 500–2000 volts. If a DC power source is used to make a DC electric field, then a higher voltage is required (e.g., 2 kV). In an automobile tire, for example, the electrodes may be strips of conductive rubber embedded in the rubber tire. In more preferred embodiments, electrodes of the AC power source are located very close to each other. As distance separating electrodes is decreased, voltage required also decreases. For example, if the electrodes are within 100 $\mu$m of each other, the required voltage is only 5 to 100 volts. The electrodes in the solid object should have an electrical conductivity greater than $10^{-10}$ S/cm. For example, in an exemplary embodiment in accordance with the invention, a rubber automobile tire comprises electrically conductive portions and electrically nonconductive portions. The electrically conductive portions function as the electrodes. The electrically nonconductive portions include the insulating interelectrode spacing between the electrodes. The solid object may contain dopants to increase electrical conductivity in the solid object.

Figure 1:
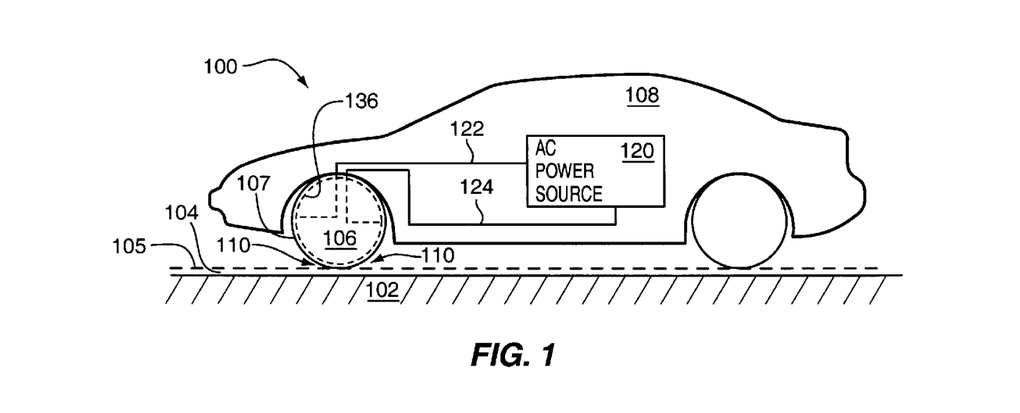
FIG. 1 depicts a system in accordance with the invention in which an AC power source generates an electric field at the contact interface between an automobile tire and a layer of ice.

FIG. 1 depicts a system 100 in accordance with the invention. FIG. 1 shows a road surface 102 covered by an ice layer 104, which has a top ice surface 105. Automobile tire 106 of automobile 108 is disposed on ice layer 104. Tire 106 has an outer, cylindrical tire surface 107. At any given moment, tire surface 107 and ice surface 105 form a contact interface 110 at the region where tire 106 rests on ice layer 104. System 100 further comprises a power source 120 located in automobile 108, preferably an AC power source. Two terminals of power source 120 are electrically connected to automobile tire 106 by power wires 122, 124. In accordance with the invention, tire 106 contains a plurality of alternately disposed, oppositely polarized electrodes 136. Power source 120 provides a potential difference between adjacent electrodes, thereby generating an electric field at contact interface 110.

It is understood that electrodes in a solid object in accordance with the invention may possess the characteristic of "electrical conductivity" in many various ways. For example, tire 106 comprises electrically conductive rubber portions fabricated by including conductive dopants in the conductive rubber portions. Carbon black is an example of a conductive dopant. Power wires 122, 124 are connected to at least one electrode each. Preferably, power wires 122, 124 are each connected to a plurality of electrodes, the electrodes being arranged alternately so that an electrode having one polarity at a given moment is adjacent to one or more electrodes having the opposite polarity. Preferably, the electrodes in tire 106 are located close to or at tire surface 107 and are closely spaced to each other so that they generate a strong electric field at contact interface 110. Power wires 122, 124 are assembled in system 100 to be non-interfering with wheel rotation of tire 106. For example, power wires 122, 124 may connect power source 120 with electrodes 136 by passing through a wheel axle.

Figure 2:
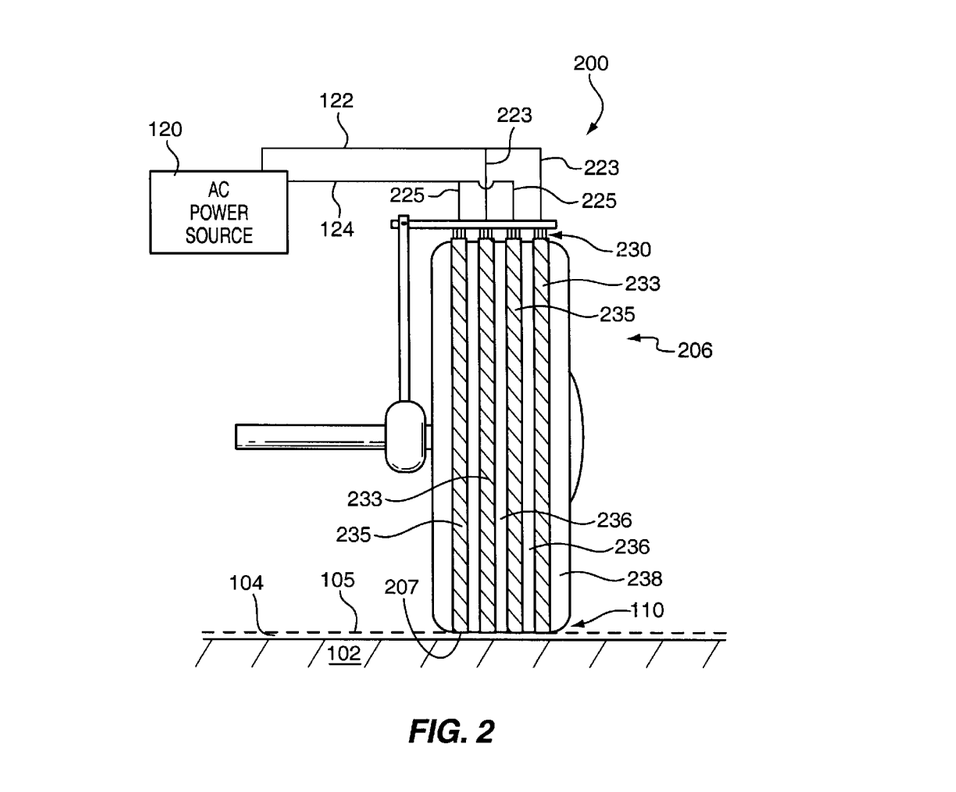
FIG. 2 depicts a portion of a system in which an automobile tire comprises a plurality of electrodes located on its outside surface that are electrically connected to the terminals of an AC power source.

An alternative embodiment 200 is depicted schematically in FIG. 2. An automobile tire 206 in accordance with the invention forms contact interface 110 with ice surface 105 of ice layer 104. Power wires 122, 124 electrically connect AC power source 120 via power leads 223, 225, respectively, to a series of flexible fiber electrodes 230. Flexible fiber electrodes 230 are, in turn, in electrical contact with a series of tire electrodes 233, 235. As depicted in FIG. 2, the plurality of tire electrodes 233 in contact with power leads 223 via flexible electrodes 230 are arranged alternately with tire electrodes 235, which are electrically connected to power leads 225 via flexible electrodes 230. A total of only four tire electrodes 233, 235 are depicted in FIG. 2. It is understood, however, that a higher number of closely-spaced tire electrodes 233, 235 and correspondingly higher number of flexible fiber electrodes 230 and power leads 223, 225 are usually desirable. Electrodes 233, 235 are separated from each other by an interelectrode spacing 236, comprising electrically insulating material. Tire 206, or other solid object, usually also comprises nonconductive regions 238, which include interelectrode spacings 236 and other portions of the solid object not occupied by electrodes 233, 235. A tire 206 in accordance with the invention typically comprises from 10 to 100 tire electrodes spaced from 1 mm to 1 cm apart in the form of thin metal wire strips embedded in rubber in a range of from 0 to 1 cm from outside tire surface 207. Alternatively, electrodes 233, 235 may be rings of electrically conductive rubber located proximate to outside tire surface 207. Clearly, the electrodes in a solid object in accordance with the invention may comprise any of a variety of shapes and compositions. Embodiments in accordance with the invention may comprise a plurality of conductive solid objects. For example, an automobile typically comprises at least two tires, such as tires 106, 206, and preferably four tires, in a system for selectively increasing ice friction.

Figure 3:
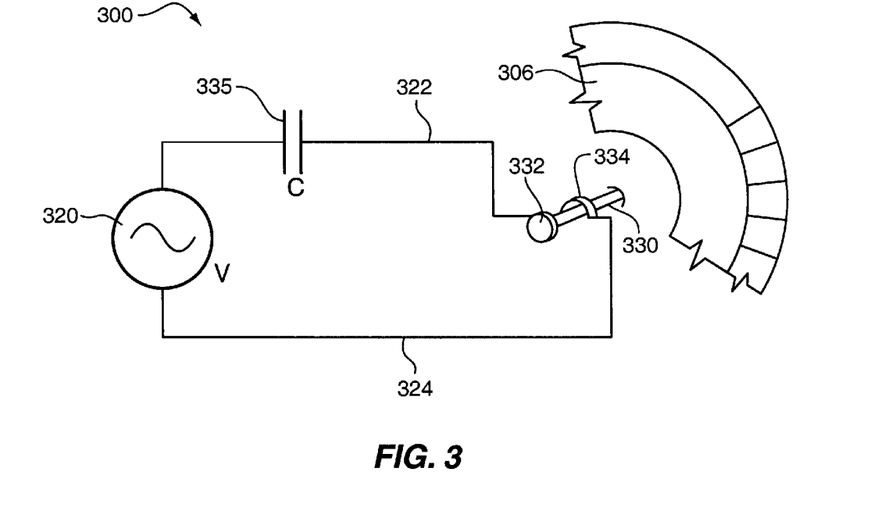
FIG. 3 shows a circuit diagram of a system containing a capacitor to reduce current flow.

Operating voltages in certain embodiments are sufficiently high to cause physical discomfort or injury to persons in electrical contact with the power source. Furthermore, knowledge of potential physical injury may cause concern among manufacturers and users of the invention. Two variations of embodiments in accordance with the invention reduce or eliminate the risk of physical injury and the anxiety arising from potential exposure to electrical shock. A first variation includes an additional impedance between the AC power source of and the electrodes to limit AC current at the electrodes. Typically, a capacitor is located in series between the electrodes and the AC power source. FIG. 3 depicts in schematic form a system 300 including a rubber tire 306 containing electrodes (not shown). The electrodes are electrically connected to AC power source 320 through axle 330, slip-rings 332, 334, and power wires 322, 324. Slip-rings 332, 334 are located on axle 330. Capacitor 335 is disposed along power line 322 in series between power source 320 and electrodes in tire 306. Capacitor 335 limits the current flowing through the electrical circuit of system 300. Since the electrical conductivity of a human hand or other conductor in a potentially harmful circuit is considerably higher than the electrical conductivity of the capacitor, most of the voltage drop occurs across the capacitor. A safe current for a human is about 5 milliamps ("mA"). The current in an AC circuit, such as system 300, is generally expressed by the equation $$I=V/Z=V\times(2\pi f C),$$

where I represents current, V represents voltage, Z is impedance, $f$ is frequency and C represents capacitance. Thus, for known values of $f$ and V, the capacitance of capacitor 335 is selected using the formula $$C<(5\text{ mA})/(2\pi f V)$$

Figure 4:
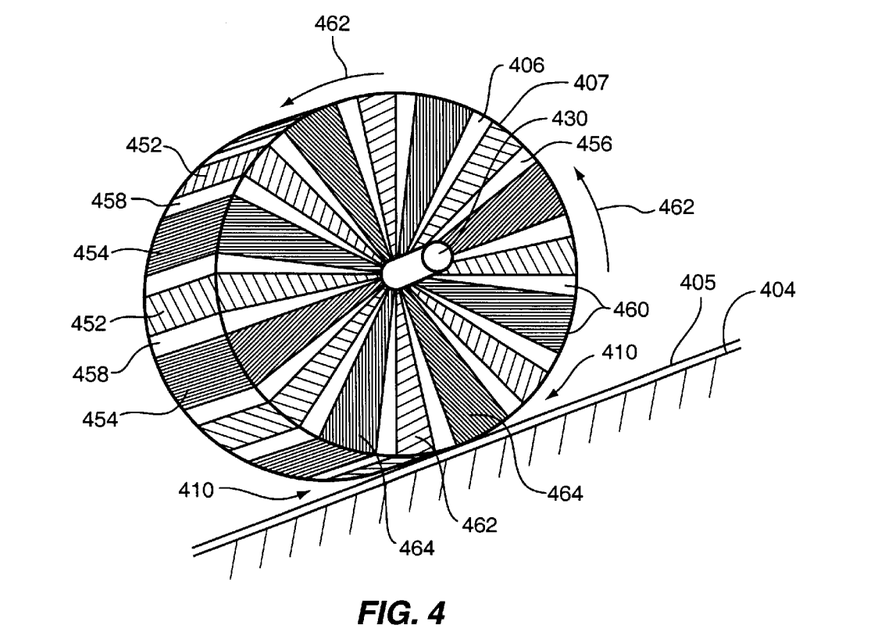
FIG. 4 shows a diagram of a tire in which conductive electrode portions at the contact interface are connected to power supply, while other portions are not connected.

As a result, very little current flows through a human hand or other conductor in contact with electrodes. A second variation includes a method and an apparatus in which voltage is applied only proximate to the ice-solid contact interface, which is least likely to come into electrical contact with the person. FIG. 4 shows in schematic form a preferred embodiment of a tire 406 as utilized in a preferred embodiment of system 300 of FIG. 3. Tire 406 has a cylindrical outer surface 407 and it is disposed on the ice layer 404, which has an ice surface 405. A plurality of conductive portions 451, 452 in tire 406 function as electrodes. Electrodes portions 451, 452 are alternately connected to power lines 322, 324, respectively, (see FIG. 3) so that the polarity of an electrode is oppositely disposed to the polarity of electrodes adjacent to it. Electrodes portions 452, 454 are separated by nonconductive portions 456, which provide an interelectrode spacing 458 between electrodes 452, 454 at cylindrical surface 407. At any given moment, as tire 406 rotates on axle 430, tire surface 407 and ice surface 405 form a contact interface 410 at the region where tire 406 rests on the ice layer 404. At any given time, only several electrodes 462, 464 of the total number of electrodes 452, 454 are present at or near contact interface 410. In a preferred embodiment in accordance with the invention, only electrodes 462, 464 located proximate to contact interface 410 are electrically connected to power source 320. The remaining electrodes 452, 454 that are not proximate to contact interface 410 at any given time are not electrically connected to power source 320. As a result, there is virtually no electrical voltage or electrical current present at the surface of the tire except that contact interface 410. Tire 406, or other solid object containing electrodes in accordance with the invention, may be designed in various ways. Tire 406 may include electrical insulation covering its outside surfaces, except for the surface 407 that comes in contact with the ice to form contact interface 410. For example, conductive rubber portions that function as electrodes 452, 454 may be wedge portions that extend from the axis region of the tire at axle 430 through the interior of the tire, reaching the exterior of the tire only at surface 407. One of various techniques is used to accomplish selective "on-off" switching between power source 320 and electrodes 452, 454 so that only electrodes 462, 464 at contact interface 410 are in electrical contact with power source 320 at any given time. Conventional slip-ring devices, such as slip rings 332, 334 depicted in FIG. 3, may be used in a switching mechanism to connect selectively electrodes 462, 464 to power source 320 when the electrodes are proximate to or approaching contact interface 410, and to disconnect the electrodes as they rotate away from contact interface 410.

Application of voltage only to conductive regions in the vicinity of the contact interface has a further advantage. As the voltage is turned "off" to regions 460 as they rotate in the direction of arrows 462 away from the contact interface, the adhesion strength between the ice and the surface of the solid decreases in regions 460. As a result, snow is more easily removed from the surface of the solid. For example, any snow that accumulates on surface 407 of tire 406 when it is in contact with a snow-covered road is more easily spun off by the action of centrifugal forces as the tire rotates.

It is understood that many different compositions of material, physical structures and devices, and fabrication methods may be used in accordance with the invention to provide electrodes and electrical connection between electrodes and the power source.

Related co-pending U.S. patent application Ser. No. 09/426,685 disclosed application of a high-frequency AC current of 1 kHz to 1000 kHz and one to several kilovolts to a conductive automobile tire to generate a potential difference between the tire and electrical ground. Such systems rely on a high-frequency high-voltage AC current to generate a capacitive electric field at the ice interface. In contrast, in embodiments in accordance with the current invention, terminals of a power source are connected to a plurality of closely-spaced conductive or semiconductive electrodes in the solid object at or proximate to the solid-ice contact interface. As a result, a very strong electric field is generated at the interface. Preferably, the power source provides AC current having a relatively low-frequency, for example, 60 Hz.

In some embodiments, the electrodes are "interdigitated". The term "interdigitated" means that a plurality of "fingers" of a first electrode are disposed alternately with a plurality of "fingers" of a second electrode. Typically, a first electrode stem is disposed proximate to a surface and parallel with a second electrode stem, proximate to the same surface. The first electrode stem is connected to one terminal of a power source, and the second electrode stem is connected to a second terminal of a power source, so that the first electrode stem in the second electrode stem have opposite polarities. A series of "fingers" of the first electrode extend in a substantially normal direction from the first electrode stem forwards the second electrode stem, without touching the second electrode stem. Similarly, a series of "fingers" of the second electrode extend in a substantially normal direction from the second electrode stem forwards the first electrode stem, without touching the first electrode stem. The fingers of the respective stems are spaced so that the fingers of the first electrode stem are adjacent to and substantially parallel with fingers of the second electrode stem. As a result of the alternating arrangement, an electrode having one polarity at a given moment is adjacent to one or more electrodes having the opposite polarity.

EXAMPLE 1

Figure 5:
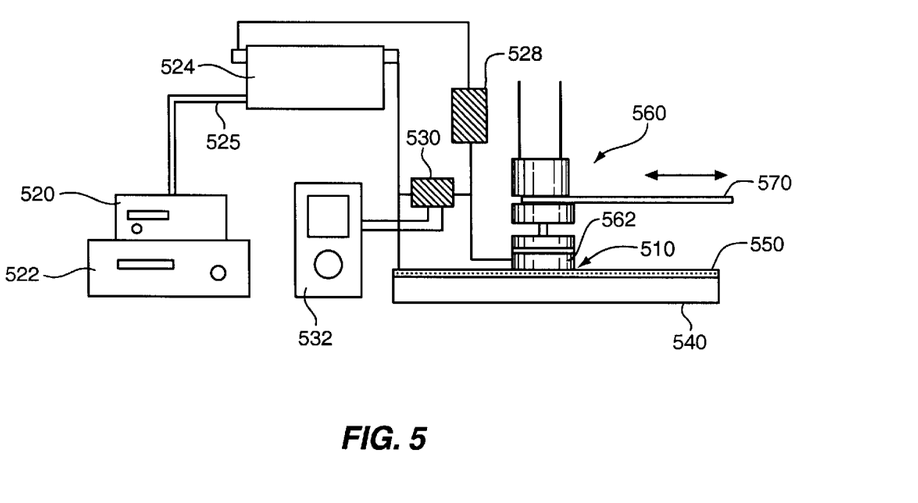
FIG. 5 depicts in schematic form an apparatus for measuring friction force generated in accordance with the invention.

Friction measurements were performed using an apparatus 500, as depicted in FIG. 5. An AC voltage having a frequency of from 5 Hz to 500 Hz was applied to an ice-solid metal contact interface 510 using an AC power supply system with a signal generator. The signal generator 520 sent a sinusoidal wave to a high power audio amplifier 522, which multiplied the current. This high current was needed to work a high voltage transformer 524. The transformer was capable of multiplying the input voltage 525 by a factor of about 100 in a frequency range of from 5 Hz to 1.5 kHz. This made it possible to generate voltages up to 500 V. Because of the safety circuit 528, which limited the current in the system, only a fraction of the voltage was applied at the ice-metal interface 510. Therefore, the voltage was measured directly at the interface using voltage measurement circuit 530, having a voltage divider made of 100 kΩ and 100 MΩ resistors, together with a digital multi-meter 532.

Ice samples were prepared using distilled water or a mixture of tap water and distilled water. The electrical resistivity of mixed water samples was $6 \times 10^4$ Ωcm. Each water sample was frozen on a stainless steel plate 540 (12 cm×18 cm) in a cold room at −10° C. to form ice layer 550. Ice layers 550 contained polycrystalline ice and had a thickness of 3.7 mm. The surface of each ice layer 550 was carefully prepared with a microtome to insure a very smooth surface. Sandpaper (No.1500) was used in a few cases to refresh the ice surface after sliding. A slider 560 included a stainless steel disk 562 having a diameter of 40 mm at the ice-metal contact interface 510. Slider 560 comprised stainless steel contact disc 562 and a load disc separated by an electric insulator (Teflon) to apply a high-voltage at ice-slider contact interface 510 safely. The weight of slider 560 was 191 g, and the normal force applied to the ice surface was 1.87 N for all the tests. Slider 560 was pulled by an XY-plotter arm 570 at a constant speed of 5 mm/s. The frictional force was measured by a small load cell (Kulite Semiconductor Products, Inc., model BG-1000GM), which uses a piezo-resistive gauge with a sensitivity of 2.48 g/mV. The measured force was recorded by a computer through an A/D converter. The acquisition frequency was 1 kHz and the resolution was 12 bits. The resolution of the force was generally about 5.9 mN.

The cold room temperature was regulated at temperatures of −5° C., −10° C. and −20° C., alternatively. The applied voltage across the ice-metal slider interface ranged from 100 V to 550 V. Variations in the surface quality of the ice, e.g. smoothness, caused the voltage to change with the slider position, and this variation was uncontrollable.

Table 1 shows representative measurements to show fluctuation of applied voltage measured at the contact interface. Table 1 also shows the average force or friction and the maximum friction force for various values of frequency and temperature. In Table 1, "F" denotes frequency; "V" denotes applied voltage, in units of volts; "I" is current, in units of microamps; "$F_{ave}$" denotes the average friction force in the presence of the applied electric field; and "$F_{max}$" denotes the maximum friction force in the presence of the electric field. The superscript "*1" of single value entries in the voltage column indicates that the fluctuation of the voltage was less than 20 V.

TABLE 1

Operating conditions and results

| F (Hz) | V (volts) | I (µA) | $F_{ave}$ (N) | $F_{max}$ (N) |
|---|---|---|---|---|
| −5° C. | | | | |
| 5 | 220*1 | 40 | 0.85 | 3.1 |
| 10 | 300–360 | 65 | 1.1 | 3.5 |
| 20 | 250–380 | 90 | 0.95 | 2.9 |
| 50 | 350–420 | 180 | 0.80 | 2.9 |
| 100 | 360–410 | 360 | 0.96 | 3.4 |
| 200 | 250–420 | 400 | 0.86 | 3.1 |
| 300 | 380–470 | 670 | 0.74 | 4.0 |
| 400 | 400–500 | 600 | 0.44 | 1.7 |
| 500 | 350–450 | 580 | 0.36 | 1.7 |
| −10° C. | | | | |
| 5 | 100–140 | 30 | 0.98 | 3.8 |
| 10 | 360*1 | 80 | 1.6 | 8.2 |
| 20 | 250–420 | 100 | 1.4 | 5.6 |
| 50 | 370*1 | 170 | 1.4 | 8.3 |
| 100 | 360*1 | 320 | 1.6 | 6.9 |
| 200 | 360*1 | 660 | 1.2 | 5.8 |
| 300 | 250–450 | 650 | 0.46 | 0.6 |
| 400 | 280–550 | 780 | 0.50 | 0.77 |

Electrical properties of ice were measured at the ice-metal contact interface. The dielectric constant and the conductivity of ice were measured in a frequency range of from 5 Hz to 100 kHz at temperatures of −5° C. and −10° C.

Figure 6:
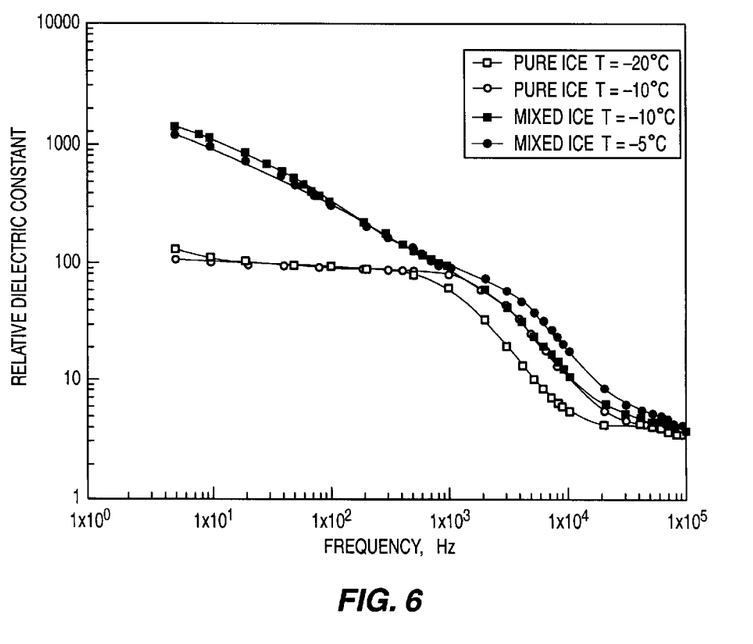
FIG. 6 shows a graph in which the relative dielectric constant of ice is plotted as a function of AC frequency.
Figure 7:
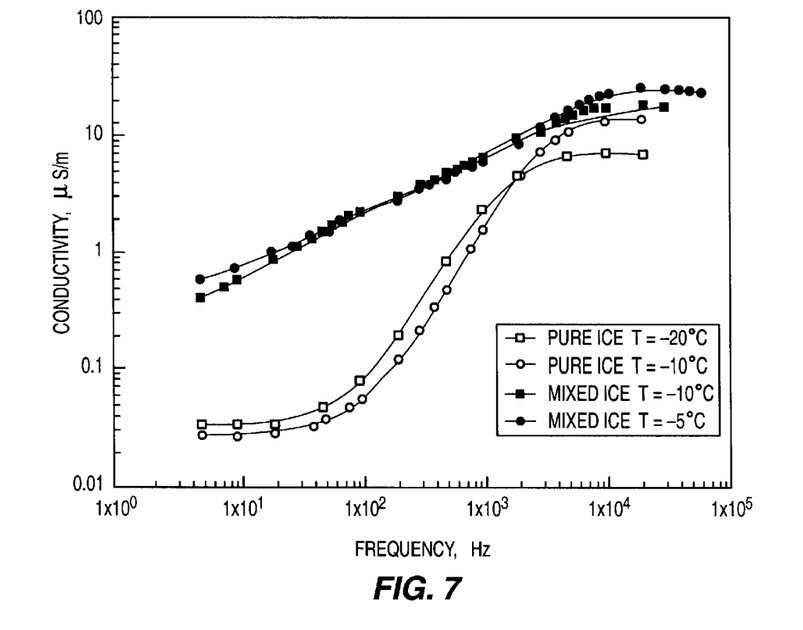
FIG. 7 shows a graph in which the conductivity of ice is plotted as a function of AC frequency.

Two disk electrodes made of brass with a diameter of 40 mm were arranged with an interelectrode spacing of 2.39 mm between them. The water mixture was disposed in the interelectrode spacing and frozen to form an ice layer. An impedance analyzer (Hewlett Packard 4192A) was used to measure the capacitance and the conductance of this thin layer of ice over a range of frequencies at both −5° C. and −10° C. Similarly, the layer of ice was made from pure water and capacitance and conductance was measured at both −10° C. and −20° C. The results of the measurements are shown in the graph of FIG. 6, in which the relative dielectric constant of ice is plotted as a function of frequency. As is well known in the art, the relative dielectric constant of the pure ice was about 100 at frequencies in a range of from 5 Hz to 1 kHz. The relative dielectric constant of the mixed ice was about 1000 at about 10 Hz. The apparent dielectric constant decreased with increasing frequency, and it was approximately equal to the dielectric constant of pure ice at 1 kHz. At a frequency higher than 2 kHz, the dielectric constants of pure and mixed ice were approximately the same. In the graph of FIG. 7, conductivity of the ice samples, in units of µS/m, are plotted as a function of frequency. The mixed ice sample had conductivity more than one order of magnitude greater than that of pure ice. As the frequency increased from 5 Hz to 1 kHz, conductivity increased from 0.5 µS/m to 10 µS/m. The difference between the conductivity of the pure ice and the mixed ice decreased as the frequency increased, but even at 10 kHz, the conductivity of the mixed ice was slightly higher than that of pure ice.

Figure 8:
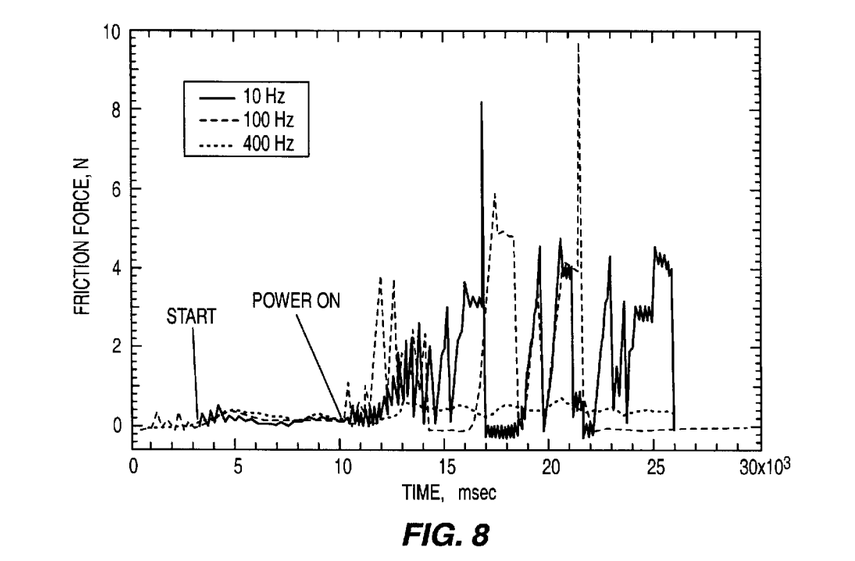
FIG. 8 shows a graph in which friction force, in units of Newtons, is plotted as a function of time, in units of milliseconds, for a stainless steel slider on an ice surface.

Measurements of frictional force between mixed ice and a stainless steel slider for AC voltages having a frequency of 10,100 and 400 Hz are shown in FIG. 8, in which friction force, in units of Newtons ("N"), is plotted as a function of time, in units of milliseconds. The average frictional force without an applied voltage was 0.23 N. This force means that the friction coefficient between the ice and the slider was 0.12 in the absence of an electric field. The frictional force increased rapidly after the voltage was applied. The applied voltage was about 400 V at the time the power was turned "ON", that is, at about 10 msec. The frictional force with a frequency of 10 Hz averaged about 1.5 N, with a maximum of 8 N. The corresponding friction coefficient is 0.8. The friction showed a "stick and slip" feature during sliding when voltage was applied. The friction with a frequency of 100 Hz shows the behavior similar to that at 10 Hz. But, the friction with a frequency of 400 Hz was very different. The stick and slip feature disappeared. The frictional force with an applied electric field at 400 Hz was lower than that at 10 Hz and 100 Hz, having an average value of about 0.5 N.

Figure 9:
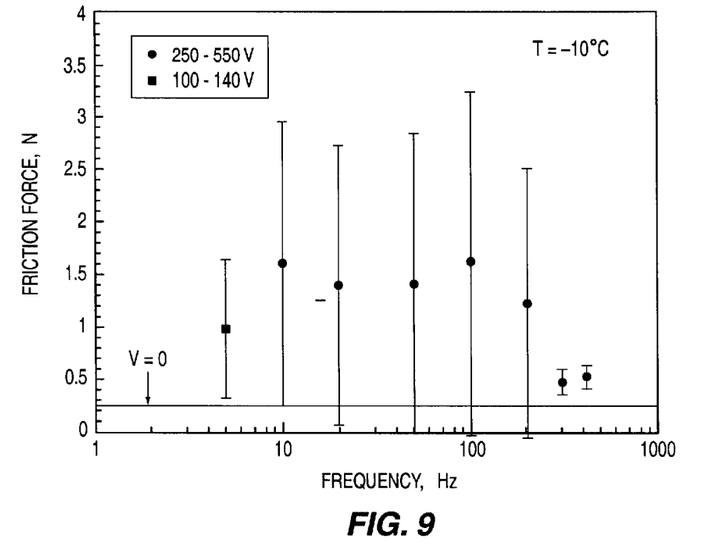
FIG. 9 shows a graph in which friction force, in units of Newtons, is plotted as a function of AC frequency at −10° C., for a stainless steel slider on an ice surface.

Friction force between mixed ice and a stainless steel slider at a temperature of −10° C. is plotted in the graph of FIG. 9 as a function of frequency. The measured applied voltage at 5 Hz was lower than at other frequencies because of the technical difficulty of inducing a high voltage at this frequency. As presented in Table 1, the applied voltages at the various frequencies were in a range of from 250 V to 550 V, except for a range of from 100 V to 140 V at 5 Hz. The solid square (5 Hz) and the solid circles indicate average friction force values. The bar associated with each square or circle designates the standard deviation of measured friction force at the corresponding frequency. The standard deviation is usually very large (about 1.5 N) because of the stick and slip feature. The straight horizontal line at a friction force value of about 0.25 N indicates the friction force between the ice and the slider when no voltage is applied. The average friction force was almost constant at about 1.5 N from 10 Hz to 200 Hz. The frictional force droped sharply at 300 Hz and the friction at 400 Hz is almost the same as that at 300 Hz.

Figure 10:
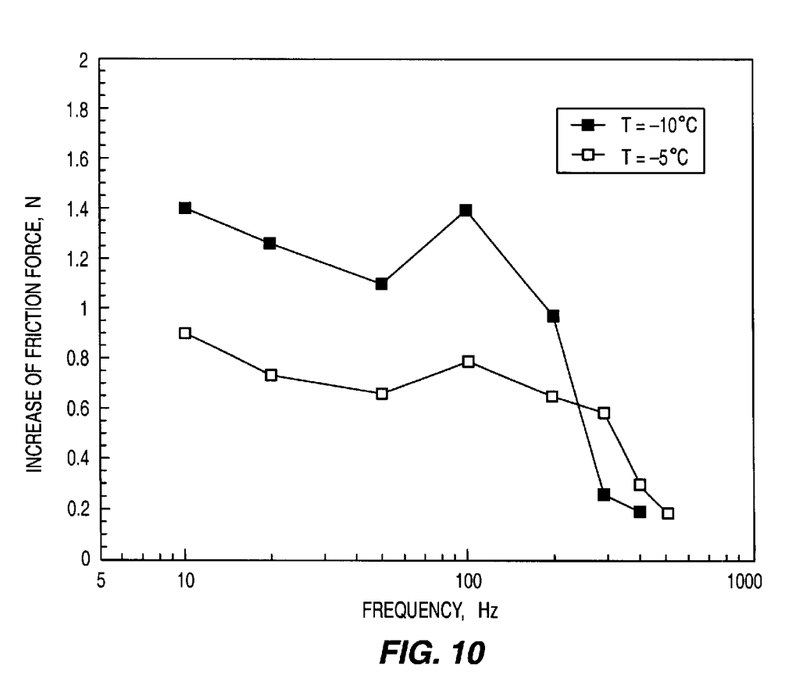
FIG. 10 shows a graph in which the increase of friction force is plotted as a function of frequency for a series of friction force measurements taken at two different temperatures, −5° C. and −10° C.

In the graph of FIG. 10, the increase of friction force is plotted as a function of frequency for a series of friction force measurements taken at two different temperatures, −5° C. and −10° C. The increase of friction force was calculated as the average friction force at an applied voltage minus the friction force present without an applied voltage. The solid squares represent increase of friction force at −10° C. The empty squares represent increase of friction force at −5° C. Comparison of the data in FIG. 10 clearly shows that the increase in frictional force at −10° C. is larger than at −5° C., but the friction force begins to drop significantly at frequencies greater than 200 Hz at both temperatures.

EXAMPLE 2

An apparatus similar to that in Example 1 was used to measure the increase in friction force at the contact interface between a stainless steel slider and a layer of ice as both AC and DC applied voltages were gradually increased.

Figure 11:
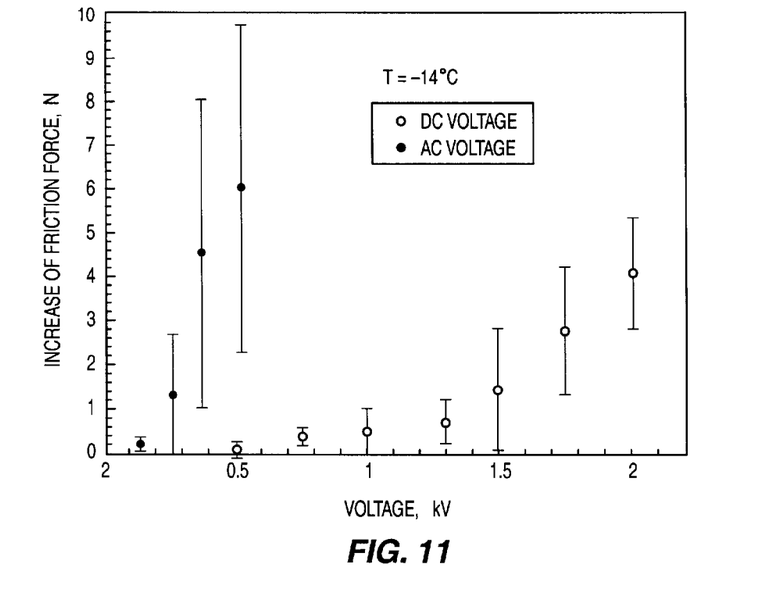
FIG. 11 shows a graph in which the increase in friction force, N, in units of Newtons, is plotted as a function of applied voltage, both AC and DC, in units of kilovolts, kV, for a stainless steel slider on ice.

Measurements were conducted at −14° C. FIG. 11 shows a graph in which the increase in friction force, in units of Newtons, is plotted as a function of applied voltage, in units of kilovolts, kV. The solid circles represent the average increase in friction force at a given applied AC voltage at 60 Hz. The bars associated with each plotted solid circle represent the standard deviation of measured increase in friction force at the corresponding AC voltage. Similarly, the hollow circles represent the average increase in friction force at a given applied DC voltage, and the bars associated with each plotted hollow circle represent the standard deviation of the of measured increase in friction force at the corresponding DC voltage. The plotted data indicate that AC voltage applied at the contact interface causes a greater increase in friction force than a DC voltage having the same magnitude. For example, an applied 60 Hz AC voltage of 0.5 kV resulted in an average increase in friction force of about 6.0 N. In contrast, an applied DC voltage of 0.5 kV caused virtually no increase in friction force. An applied DC voltage of 2.0 kV resulted in an average increase of friction force of approximately 4.0. The data indicate that use of only about 350 volts of AC voltage could achieve a similar friction force increase of 4 N. Thus, this example shows that an AC electric field at the contact interface causes a greater increase in friction force than a DC electric field of similar strength.

EXAMPLE 3

An apparatus similar to that in Example 1 was set up to measure the friction force caused by an AC electric field at the contact interface between a conductive rubber disk and a layer of ice. The contact disc had a diameter of 40 mm and was made of conductive rubber, doped with carbon black and having a conductivity of about $10^{-4}$ S/cm. The sole of the rubber disc was polished by fine, No. 2000 grade sandpaper. The ice layer was made from mixed water having a resistivity of about $6\times10^5$ Ωcm. The water was frozen at −10° C. gradually to make polycrystalline ice without bubbles, and the ice surface was finished by a microtome to make a plane surface without visible roughness. The ice layer had a thickness of 3 to 4 mm.

The X-Y plotter arm was moved at a constant speed of 0.33 cm/sec, which was the slider speed. One terminal of an AC power supply was connected to the conductive rubber contact disc of the slider, and a second terminal of the AC power supply was connected to the stainless steel plate beneath the ice. At a temperature of −10° C., the slider was pulled without voltage for about 40 seconds. Then, a 60 Hz AC voltage of 1.1 kV was applied at the ice-metal contact interface. At the time of about 75 seconds, the applied voltage was turned "off". The electric signals from the force sensor during the time period 0 to 80-plus seconds were recorded using an A/D converter and converted into a measured friction force value.

Figure 12:
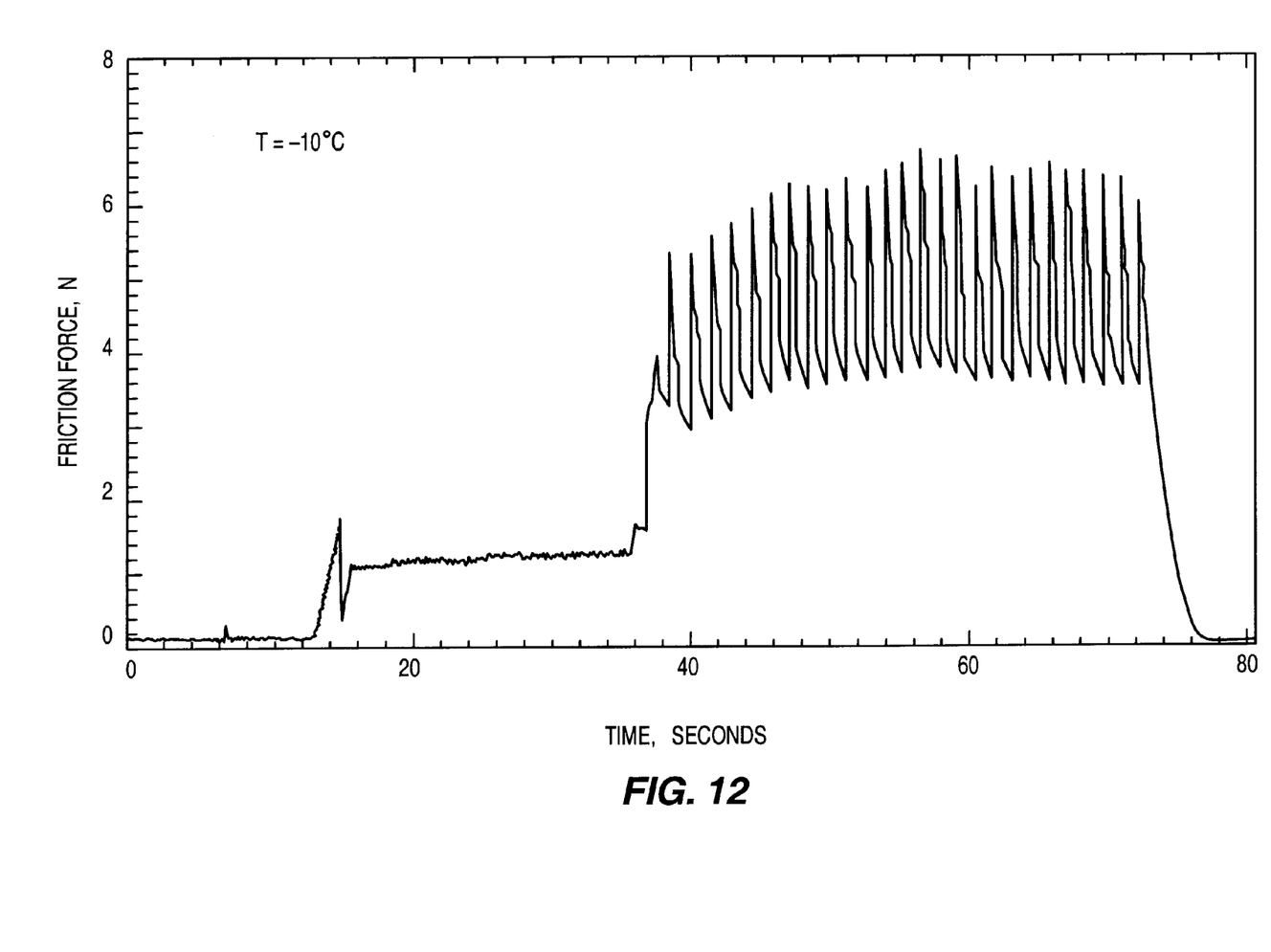
FIG. 12 shows a graph in which friction force, N, in units of Newtons, is plotted as a function of time, in units of seconds, for a conductive rubber slider on an ice surface.

FIG. 12 shows a graph in which friction force, in units of Newtons, is plotted as a function of time, in units of seconds. Friction force measured before application of the voltage indicates a kinetic friction force of about 1 N. The graph in FIG. 12 shows that application of 1.1 kV resulted in a significant increase in friction force, with maximum peaks exceeding 6.0 N, and an average measured value of about 4 N.

EXAMPLE 4

Figure 13:
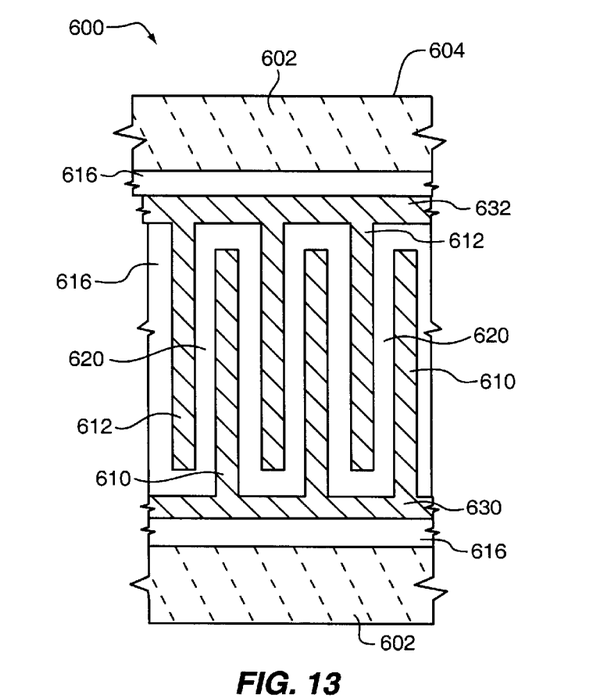
FIG. 13 depicts in diagrammatic form a section of interdigitated copper electrodes having narrow interelectrode spacings and located on the surface of a solid object.

A series of interdigitated electrodes were deposited on a nonconductive solid substrate using standard photolithographic techniques. FIG. 13 depicts in diagrammatic form a section 600 of the bottom surface 602 of a glass slider disk 604. Interdigitated copper electrodes 610, 612 were formed using photolithography on Kapton film 606. Kapton film 606 was then attached to bottom surface 602 for friction force measurements using the apparatus described in Example 1. Electrodes 610, 612 had a thickness of approximately 3 μm and a width of approximately 50 μm. Inter-electrode spacings 620, separating adjacent electrodes 610, 612, had a width of approximately 50 μm. A first terminal of the AC power source was connected to electrode stem 630, and a second terminal of the power source was connected to electrode stem 632. Thus, adjacent electrodes 610, 612 were oppositely polarized in accordance with the invention during the AC power cycles applied to the electrodes.

An AC voltage having a frequency of 60 Hz was applied to the electrodes. The applied voltage measured at the disk-ice contact interface variant arrange of from 25 to 50 volts. Friction force measurements indicated in increase in friction force at the contact interface of approximately 30 times the friction force presents in the absence of the electric field generated by the applied voltage. The measurements showed that a small interelectrode spacing between electrodes increases friction force at the solid-ice contact interface.

In embodiments in accordance with the invention, it is critical that the electric field at the contact interface be strong. Generally, the electric field has a value not less than 100 V/cm. A strong electric field, V/d, is generated in the system or a method in accordance with the invention by selecting the variables V or d accordingly. As shown in Example 4, when interelectrode spacing is narrow, a relatively low voltage achieves a large increase in friction. Preferably, the AC electric field has a value in a range of from 100 V/cm to $10^5$ V/cm. Of course, an AC electric field greater than $10^5$ V/cm is useful when a very large increase in friction is desired and the values of the variables V or d can be selected accordingly. As shown by the data plotted in a graph of FIG. 11, an AC voltage applied to the electrodes to generate an AC electric field at the contact interface is more effective than a DC electric field to increase friction. Nevertheless, in certain circumstances, an embodiment in accordance with the invention in which DC voltage generates a DC electric field is useful. In such circumstances, if the interelectrode spacing exceeds one mm, then the applied DC voltage is greater than 1000 volts. In embodiments using DC voltage and having an interelectrode spacing less than one mm, the applied DC voltage may be less than 1000 volts. Nevertheless, when the interelectrode spacing is less than one cm, and especially if it is one mm or less, then formation of electrolysis gases at the closely spaced electrodes significantly decreases friction. The detrimental effect of electrolysis can be controlled by carefully selecting the applied DC voltage to keep formation of electrolysis at a minimum, while generating a sufficiently strong electric field to increase friction at the contact interface.

A method and a system in accordance with the invention for increasing friction may be used to increase ice friction of various kinds of objects in various applications, especially in transportation applications, such as automobile and airplane tires, train wheels, and snow skis, as well as shoe soles. Systems and methods in accordance with the invention provide, therefore, useful and practical solutions to some of problems associated with skidding and slipping on ice. Although the embodiments have been described principally with regard to automobile tires, the structures and methods herein described are applicable to "sliders" in general, that is, to many other types of objects and areas of application besides tires on paved surfaces. It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. Since certain changes may be made in the above apparatus and methods without departing from the scope of the invention, it is intended that all subject matter contained in the above description or shown in the accompanying drawing be interpreted as illustrative and not in a limiting sense. Consequently, the invention is to be construed as embracing each and every novel feature and novel combination of features present in or inherently possessed by the systems, methods and compositions described in the claims below and by their equivalents.

I claim:

1. A system for increasing friction at a contact interface between a layer office and a solid object, comprising:
   a plurality of electrodes, wherein the electrodes are located proximate to the contact interface;
   an AC power source electrically connected to the electrodes, wherein the power source is capable of providing a potential difference across the electrodes to generate an AC electric field at the contact interface,
   the solid object comprising at least one of (a) a wheel, (b) a track of a tracked vehicle, (c) a tread of a tracked vehicle, (d) a shoe sole, (e) a slider, (f) sport equipment, and (g) a ski.

2. A system as in claim 1, whereby the power source provides an AC electric field having a frequency not exceeding 1000 Hz.

3. A system as in claim 1, whereby the power source provides an AC electric field having a frequency not exceeding 200 Hz.

4. A system as in claim 1, whereby the power source provides an AC electric field having a frequency not exceeding 100 Hz.

5. A system as in claim 1, wherein the electric field has a value not less than 100 V/cm.

6. A system as in claim 1, wherein the electric field has a value in a range of from 100 V/cm to $10^5$ V/cm.

7. A system as in claim 1, wherein the electrodes are separated from each other by an interelectrode spacing not exceeding 4 mm.

8. A system as in claim 1, whereby the electrodes are separated from each other by an interelectrode spacing not exceeding 100 $\mu$m.

9. A system as in claim 1, whereby the electrodes are interdigitated.

10. A system as in claim 1, further comprising electrical insulation that insulates each of the electrodes.

11. A system as in claim 1, wherein the electrodes possess an electrical conductivity greater than $10^{-10}$ S/cm.

12. A system as in claim 1, further comprising an additional impedance between the AC power source and the electrodes to limit AC current at the electrodes.

13. A system as in claim 12, comprising capacitor in series between the AC power source and the electrodes.

14. A system as in claim 1, further comprising electrodes that are not proximate to the contact interface and are not electrically connected to the AC power source.

15. A system as in claim 14, further comprising a switching mechanism for electrically connecting the AC power source to electrodes proximate to the contact interface and for electrically disconnecting the AC power source from electrodes not proximate to the contact interface.

16. A system as in claim 1, further comprising dopants that impart electrical conductivity in the electrodes.

17. A system as in claim 1, wherein the layer of ice covers a paved surface and the solid object is a rubber tire.

18. A system as in claim 17, wherein the rubber tire contains a plurality of electrodes and dopants to impart electrical conductivity in the electrodes.

19. A system as in claim 18, wherein the rubber tire contains carbon black to impart electrical conductivity.

20. A system as in claim 1, whereby the wheel comprises a tire.

21. A system as in claim 1, whereby the wheel comprises a wheel of an automobile.

22. A system as in claim 1, whereby the ski comprises a snow ski.

23. A system as in claim 1, whereby the wheel comprises a wheel of a train.

24. A system as in claim 1, comprising a plurality of conductive solid objects, each solid object forming a contact interface with a layer of ice, each solid object including a plurality of electrodes, and an AC power source electrically connected to each of the electrodes, wherein the power source is capable of providing a potential difference across the electrodes to generate an AC electric field at a contact interface.

25. A system as in claim 24, whereby the plurality of solid objects are automobile tires.

26. A system as in claim 1, whereby the power source provides a voltage in a range of from 1 to 5000 volts.

27. A system as in claim 1, whereby the AC power source provides a voltage in a range of from 100 to 2000 volts.

28. A system as in claim 1, whereby the AC power source provides a voltage not exceeding 100 volts.

29. A system as in claim 1, whereby the AC power source provides a voltage in a range of from 5 to 100 volts.

30. A method for increasing friction at a contact interface between a layer of ice and a solid object comprising steps of:
 providing a solid object comprising at least one of (a) a wheel, (b) a track of a tracked vehicle, (c) a tread of a tracked vehicle, (d) a slider, (f) sport equipment, and (g) a ski; and
 generating an AC electric field at the contact interface.

31. A method as in claim 30 whereby the AC electric field has a frequency not exceeding 1000 Hz.

32. A method as in claim 30 whereby the AC electric field has a frequency not exceeding 200 Hz.

33. A method as in claim 30 whereby the AC electric field has a frequency not exceeding 100 Hz.

34. A method as in claim 30 comprising providing an electric field having a value not less than 100 V/cm.

35. A method as in claim 30 comprising providing an electric field having a value in a range of from 100 V/cm to $10^5$ V/cm.

36. A method as in claim 30, further comprising:
 providing an AC potential difference across a plurality of electrodes located proximate to the contact interface.

37. A method as in claim 36, wherein the potential difference is in a range of from 1 to 5000 volts.

38. A method as in claim 36, wherein the potential difference is in a range of from 100 to 2000 volts.

39. A method as in claim 36, wherein the potential difference does not exceed 100 volts.

40. A method as in claim 36, wherein the potential difference is in a range of from 5 to 100 volts.

41. A method as in claim 36, further comprising switching the potential difference "off" to electrodes that are Dot proximate to the contact interface.

42. A system for increasing friction at a contact interface between a layer of ice and a solid object, comprising:
 a plurality of electrodes, wherein the electrodes are located with the solid object and proximate to the contact interface, the solid object comprising at least one of (a) a wheel, (b) a track of a tracked vehicle, (c) tread of a tracked vehicle, (d) a shoe sole, (e) a slider, (f) snort equipment, and (g) a ski;
 an DC power source electrically connected to the electrodes, wherein the power source is capable of providing a DC potential difference greater than 1000 volts across the electrodes to generate a DC electric field at the contact interface.

43. A system as in claim 42, wherein the electric field has a value not less than 100 V/cm.

44. A system as in claim 42, wherein the electric field has a value in a range of from 100 V/cm to $10^5$ V/cm.

45. A method for increasing friction at a contact interface between a layer of ice and a solid, comprising the steps of:
 providing a solid object comprising at least one of (a) a wheel, (b) a track of a tracked vehicle, (c) a tread of a tracked vehicle, (d) shoe sole, (e) a slider, (f) spat equipment, and (g) a ski; and
 generating an DC electric field at the contact interface, wherein electric field has a value not less than 100 V/cm.

46. A method as in claim 45, wherein the electric field has a value in a range of from 100 V/cm to $10^5$ V/cm.

47. A method for increasing friction at a contact interface between a layer of ice and a solid object comprising the of:
 providing a solid object comprising at least one of (a) a wheel, (b) a track of a tracked vehicle, (c) a tread of a tracked vehicle, (d) shoe sole, (e) a slider, (f) sport equipment, and (g) a ski; and
 providing a DC potential difference greater than 1000 volts across two electrodes located proximate to the contact interface.

48. A system for increasing friction at a contact interface between a layer office and a solid object, comprising:
 a plurality of electrodes arranged with the solid object comprising at least one of (a) a wheel, (b) a track of a tracked vehicle; (c) a red of a tracked vehicle, (d) a shoe sole, (e) a slider, (f) sport equipment, and (g) a ski, wherein the electrodes are located proximate to the contact interface, and the electrodes are separated from each other by an interelectrode spacing not exceeding one mm;
 a DC power source electrically connected to the electrodes, wherein the power source is capable of providing a potential difference across the electrodes to generate an electric field at the contact interface.

49. A system as in claim 48, whereby the electrodes are separated from each other by an interelectrode spacing not exceeding 100 μm.

50. A system as in claim 48, wherein the electric field has a value not less than 100 V/cm.

51. A system as in claim 48, wherein the electric field has a value in a range of from 100 V/cm to $10^5$ V/cm.

52. A system as in claim 48, whereby the power source provides a voltage in a range of from 1 to 1000 volts.

53. A method for increasing friction at a contact interface between a layer of ice and a solid object, comprising steps of:
 providing a solid object comprising at least one of (a) a wheel, (b) a track of a racked vehicle, (c) a tread of a tacked vehicle, (d) a shoe sole, (e) a slider, (f) sport equipment, and (g) a ski; and
 generating an DC electric field at the contact interface by providing a potential difference across two electrodes located proximate to the contact interface, whereby the electrodes are separated from each other by an interelectrode spacing not exceeding one mm.

54. A method as in claim 53, wherein the DC electric field has a value not less than 100 V/cm.

* * * * *

UNITED STATES PATENT AND TRADEMARK OFFICE
CERTIFICATE OF CORRECTION

PATENT NO.    : 6,693,786 B2
DATED         : February 17, 2004
INVENTOR(S)   : Victor F. Petrenko It is certified that error appears in the above-identified patent and that said Letters Patent is hereby corrected as shown below:

Column 14,
Line 2, delete "office" and insert therefor -- of ice --.
Line 41, delete "comprising capacitor" and insert therefor -- comprising a capacitor --.

Column 15,
Line 23, delete "(d) a slider, (f) sport equipment" and insert therefor -- (d) a shoe sole, (e) a slider, (f) sport equipment --.
Line 50, delete "Dot" and insert therefor -- not --.
Lines 57-58, delete "(c) tread of a tracked vehicle" and insert therefor -- (c) a tread of a tracked vehicle --.
Line 59, delete "(f) snort equipment" and insert therefor -- (f) sport equipment --.

Column 16,
Line 9, delete "(d) shoe sole" and insert therefor -- (d) a shoe sole --.
Lines 9-10, delete "(f) spat equipment" and insert therefor -- (f) sport equipment --.
Line 16, delete "comprising the of" and insert therefor -- comprising the steps of --.
Line 20, delete "(d) shoe sole" and insert therefor -- (d) a shoe sole --.
Line 26, delete "office" and insert therefor -- of ice --.
Line 30, delete "(c) a red of a tracked vehicle" and insert therefor -- (c) a tread of a tracked vehicle --.
Line 53, delete "(b) a track of a racked vehicle" and insert therefor -- "(b) a track of a tracked vehicle --.
Line 54, delete "tacked vehicle" and insert therefor -- tracked vehicle --.

Signed and Sealed this

Twenty-second Day of June, 2004

JON W. DUDAS
*Acting Director of the United States Patent and Trademark Office*